United States Patent
Aditya et al.

(10) Patent No.: US 11,475,220 B2
(45) Date of Patent: Oct. 18, 2022

(54) PREDICTING JOINT INTENT-SLOT STRUCTURE

(71) Applicant: ADOBE INC., San Jose, CA (US)

(72) Inventors: Somak Aditya, Bangalore (IN); Sharmila Nangi Reddy, Telangana (IN); Pranil Joshi, Thane (IN); Kushal Chawla, Los Angeles, CA (US); Bhavy Khatri, Rajasthan (IN); Abhinav Mishra, Bihar (IN)

(73) Assignee: ADOBE INC., San Jose, CA (US)

( * ) Notice: Subject to any disclaimer, the term of this patent is extended or adjusted under 35 U.S.C. 154(b) by 315 days.

(21) Appl. No.: 16/797,164

(22) Filed: Feb. 21, 2020

(65) Prior Publication Data

US 2021/0264111 A1    Aug. 26, 2021

(51) Int. Cl.
| | | |
|---|---|---|
| *G06F 40/284* | (2020.01) | |
| *G06N 3/08* | (2006.01) | |
| *G06F 40/117* | (2020.01) | |
| *G06F 40/30* | (2020.01) | |
| *G06N 3/04* | (2006.01) | |

(52) U.S. Cl.
CPC .......... *G06F 40/284* (2020.01); *G06F 40/117* (2020.01); *G06F 40/30* (2020.01); *G06N 3/08* (2013.01); *G06N 3/04* (2013.01)

(58) Field of Classification Search
CPC ...... G06F 40/30; G06F 40/284; G06F 40/117; G06N 3/08
See application file for complete search history.

(56) References Cited

U.S. PATENT DOCUMENTS

| 11,258,734 | B1* | 2/2022 | Shevchenko | .......... H04N 7/147 |
| 2017/0132288 | A1* | 5/2017 | Ho | .......... G06F 40/247 |
| 2017/0133006 | A1* | 5/2017 | Lee | .......... G10L 15/063 |
| 2017/0230705 | A1* | 8/2017 | Pardue | .......... H04N 21/42222 |
| 2018/0082183 | A1* | 3/2018 | Hertz | .......... G06N 5/00 |

(Continued)

OTHER PUBLICATIONS

Bapna, et al., "Towards Zero-Shot Frame Semantic Parsing for Domain Scaling", Proc. Interspeech 2017, arXZiv:1707.02363va [cs.AI] Jul. 7, 2017, pp. 2476-2480.

(Continued)

*Primary Examiner* — Kevin Ky
(74) *Attorney, Agent, or Firm* — F. Chau & Associates, LLC

(57) ABSTRACT

Systems and methods for natural language processing (NLP) are described. The systems may be trained by identifying training data including clean data and noisy data; predicting annotation information using an artificial neural network (ANN); computing a loss value for the annotation information using a weighted loss function that applies a first weight to the clean data and at least one second weight to the noisy data; and updating the ANN based on the loss value. The noisy data may be obtained by identifying a set of unannotated sentences in a target domain, delexicalizing the set of unannotated sentences, finding similar sentences in a source domain, filling at least one arbitrary value in the similar delexicalized sentences, generating annotation information for the similar delexicalized sentences using an annotation model for the source domain, and applying a heuristic mapping to produce annotation information for the sentences in the target domain.

20 Claims, 7 Drawing Sheets

(56) References Cited

U.S. PATENT DOCUMENTS

| | | | |
|---|---|---|---|
| 2019/0294695 A1* | 9/2019 | Stoyanovsky | G06F 16/36 |
| 2019/0365341 A1* | 12/2019 | Chan | A61B 6/5258 |
| 2020/0160177 A1* | 5/2020 | Durand | G06F 16/906 |
| 2020/0293611 A1* | 9/2020 | Das | G06F 40/268 |
| 2020/0320354 A1* | 10/2020 | Ghesu | G06K 9/6267 |
| 2021/0019373 A1* | 1/2021 | Freitag | G06F 40/51 |
| 2021/0124876 A1* | 4/2021 | Kryscinski | G06K 9/6259 |
| 2021/0174032 A1* | 6/2021 | De Peuter | G06N 5/02 |
| 2021/0264111 A1* | 8/2021 | Aditya | G06N 3/0454 |

OTHER PUBLICATIONS

Bordes, et al., "Learning End-To-End Goal-Oriented Dialog", arXiv preprint arXiv:1605.07683, Weston. 2016, 15 pages.

Chen, et al., "BERT for Joint Intent Classification and Slot Filling", 2019a, arXiv preprint arXiv:1902.10909. 6 pages.

Chen, et al., "Zero-Shot Learning of Intent Embeddings for Expansion by Convolutional Deep Structured Semantic Models", IEEE International Conference on Acoustics, Speech and Signal Processing (ICASSP), pp. 6045-6049.

Devlin, et al., "BERT: Pre-Training of Deep Bidirectional Transformers for Language Understanding", Proceedings of the 2019 Conference of the North American Chapter of the Association for Computational Linguistics: Human Language Technologies, vol. 1 (Long and Short Papers), Minneapolis, Minnesota Association for Computational Linguistics, arXiv:1810.04805v2 [cs.CL] May 24, 2019, pp. 4171-4186.

Dhingra, et al., Towards End-To-End Reinforcement Learning of Dialogue Agents for Information Access, Proceedings of the 55th Annual Meeting of the Association for Computational Linguistics (vol. 1: Long Papers), arXiv:1609.00777v3 [cs.CL] Apr. 20, 2017, pp. 484-495.

Gross, et al., "Training Conditional Random Fields for Maximum Label Wise Accuracy", Advances in Neural Information Processing Systems, 2007, pp. 529-536.

Hinton, et al., "Distilling the Knowledge in a Neural Network", arXiv:1503.02531v1 [stat.ML] Mar. 9, 2015, 9 pages.

Ilievski, et al., "Systematic Study of Long Tail Phenomena in Entity Linking", Proceedings of the 27th International Conference on Computational Linguistics, Santa Fe, New Mexico, USA, Association for Computational Linguistics, 2018, pp. 664-674.

Kim, et al., "ONENET: Joint Domain, Intent, Slot Prediction for Spoken Language Understanding", 2017 IEEE Automatic Speech Recognition and Understanding Work-shop (ASRU), arXiv:1801.05149v1 [cs.CL] Jan. 16, 2018, pp. 547-553.

Parisi, et al., "Continual Lifelong Learning With Neural Networks: A Review", Neural Networks, arXiv:1802.07569v4 [cs.LG] Feb. 11, 2019, 29 pages.

Shah, et al., "Building a Conversational Agent Overnight With Dialogue Self-Play", arXiv preprint arXiv:1801.04871v1 [cs.AI] Jan. 15, 2018, 11 pages.

Sukhbaatar, et al., "Training Convolutional Networks With Noisy Labels", arXiv preprint arXiv:1406.2080v4 [cs.CV] Apr. 10, 2015, 11 pages.

Wu, et al., "Transferable Multi-Domain State Generator for Task-Oriented Dialogue Systems", Proceedings of the 57th Annual Meeting of the Association for Computational Linguistics (vol. 1: Long Papers). Association for Computational Linguistics, arXiv:1905.08743v2 [cs.CL] May 26, 2019, 12 pages.

Xia, et al., "Zero-Shot User Intent Detection via Capsule Neural Networks", Proceedings of the 2018 Conference on Empirical Methods in Natural Language Processing, Brussels, Belgium. Association for Computational Linguistics, arXiv:1809.003851a [cs.CL] Sep. 2, 2018, pp. 3090-3099.

Yang, et al., "Distantly Supervised NER With Partial Annotation Learning and Reinforcement Learning", Proceedings of the 27th International Conference on Computational Linguistics, pp. 2159-2169.

C. Zhang, et al., "Joint Slot Filling and Intent Detection via Capsule Neural Networks", Proceedings of the 57th Annual Meeting of the Association for Computational Linguistics, Florence, Italy, Association for Computational Linguistics, arXiv:1812.09471v2 [cs.CL] Jul. 8, 2019, pp. 5259-5267.

Z. Zhang, et al., "Generalized Cross Entropy Loss for Training Deep Neural Networks With Noisy Labels", Proceedings of the 32nd International Conference on Neural Information Processing Systems, NIPS'18, Curran Associates Inc., USA, arXiv:1805.07836v4 [cs.LG] Nov. 29, 2018, pp. 8792-8802.

* cited by examiner

PREDICTING JOINT INTENT-SLOT STRUCTURE

BACKGROUND

The following relates generally to natural language processing (NLP), and more specifically to predicting annotation information for a target domain utilizing a model trained in a different domain.

Automated conversational agents, also known as assistants or chatbots, are widely used to simulate how humans interact. For example, conversational agents may be used in customer support applications to gather details and provide information to customers. In many cases, a conversational agent may perform NLP tasks using an artificial neural network (ANN).

However, training an ANN to perform NLP tasks effectively may require a large amount of annotated training data. Furthermore, in many cases, the training is done for each subject domain independently. Generating the annotated training data for each domain may be costly and time consuming. Therefore, there is a need in the art for more efficient systems and methods to train conversational agents.

SUMMARY

A method for predicting annotation information using a model trained in another domain is described. Embodiments of the method may identify natural language processing (NLP) training data including clean data and noisy data for structured annotations, predict annotation information for the training data using an artificial neural network (ANN), compute a loss value for the annotation information using a weighted loss function, wherein the weighted loss function applies a first weight to the clean data and at least one second weight to the noisy data, the at least one second weight being between zero and the first weight, and update the ANN based on the loss value.

A method for predicting annotation information using a model trained in another domain are described. Embodiments of the method may identify a set of unannotated sentences in a target domain, delexicalize the set of unannotated sentences, find a similar delexicalized sentence in a source domain corresponding to each sentence in the set of unannotated sentences, fill at least one arbitrary value in the similar delexicalized sentence, generate annotation information for the similar delexicalized sentence using an annotation model for the source domain, apply a heuristic mapping to the annotation information for the similar delexicalized sentence in the source domain to produce annotation information for the corresponding sentence in the set of unannotated sentences in the target domain, and train an ANN using training data including clean data and noisy data, wherein the noisy data include the annotation information for the corresponding sentence in the set of unannotated sentences.

A system for predicting annotation information using a model trained in another domain are described. Embodiments of the system may include a distant supervision pipeline configured to generate noisy annotation data for sentences in a target domain based on similarities between sentences in the target domain and sentences in a source domain, an annotation model for the source domain, and a heuristic mapping between the source domain and the target domain, an encoder configured to generate encoded representations for the sentences in the target domain, and a decoder configured to generate annotation data for sentences in the target domain based on the encoded representations, wherein the encoder and the decoder are trained using a weighted loss function that applies a first weight to clean data and a second weight to noisy data including the noisy annotation data for sentences in the target domain.

DETAILED DESCRIPTION

Figure 1:
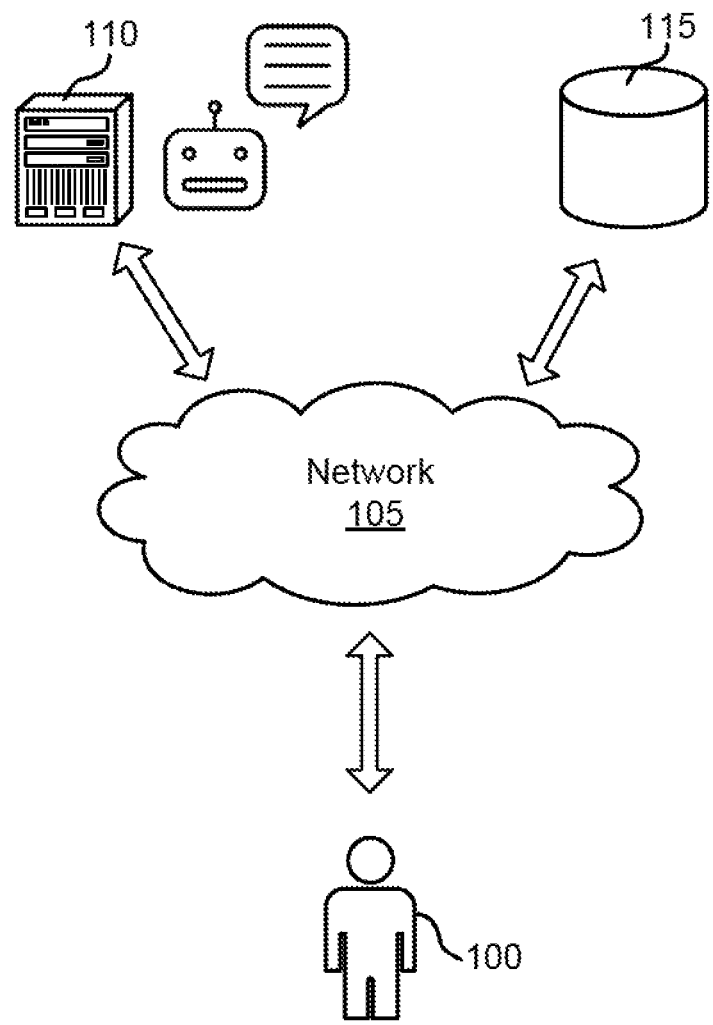
FIG. 1 shows an example of a natural language processing (NLP) system according to aspects of the present disclosure.

The present disclosure describes systems and methods for training and utilizing a natural language processing (NLP) model in a way that leverages knowledge from a model trained in a different subject domain. According to certain embodiments, an NLP model may be used in an automated conversational agent. Automated conversational agents, also known as assistants or chatbots, may be used to simulate human conversation using NLP tasks such as spoken language understanding (SLU). For example, conversational agents may be used in customer support applications to gather details and provide information to customers.

SLU tasks include detecting the intent of language and identifying values related to domain-specific slot-types from natural language queries. Identified values may be represented by a sequence of tokens. For example, in the movie-ticket booking related query "I want to book tickets for 3 people for tomorrow", the intent of the phrase is to inform (i.e., as opposed to asking a question), and the slot-value pairs include {number-of-people: 3, date: tomorrow}.

Training an ANN to perform SLU tasks may require a large amount of annotated training data. In many cases, the training is done for each subject domain independently. For example, a model trained to understand language related to buying movie tickets may be trained independently of a model used to make restaurant reservations. Generating the annotated training data for each domain may be costly and time consuming, but conventional models largely ignore the knowledge available from pre-trained models in other domains.

One reason that these models do not reuse knowledge learned from other domains is that training data gathered from models trained in another domain can be noisy. Some machine learning methods learn a conditional distribution $P(y|x)$, where x (the sentence) and y (the class, e.g., "intent") are both random variables. For different domains, the random variables follow different distributions. So, using the output of another trained model in different domain may cause errors (i.e., noise).

For example, a model trained to assist in making restaurant reservations may make a substantial number of errors in understanding queries related to buying movie tickets. If training data for the movie ticket model is gathered by interacting with the restaurant reservation model, these errors can reduce the accuracy of the trained movie ticket model.

For example, if a restaurant model is provided the query "I want to buy tickets for Charlie and the Chocolate Factory," it may interpret "Chocolate Factory" as a restaurant, and "Charlie" as a person for whom the reservation is made. Including this annotation data for training the movie-ticket model may reduce the overall accuracy rather than improve it. Conventional models may be more accurate when they do not incorporate knowledge learned from other domains. However, this results in the need to generate a large amount of training data for each domain.

Therefore, the present disclosure provides a neural network architecture to train an NLP model (e.g., a joint intent and slot-value prediction model) in a target domain with relatively few annotations by incorporating knowledge learned in a source domain. Embodiments of the present disclosure identify the intent and slot-value pairs for utterances in a target domain, using a black-box dialog agent in the source domain. For example, noisy data may be generated by delexicalizing a sentence in the target domain, finding a similar sentence in the source domain, filling the similar sentence with arbitrary values, consulting the source model to provide annotation information, and mapping the annotation information back into the target domain.

Embodiments improve prediction accuracy by effectively incorporating both clean data (with correct annotations) and noisy data (where some of the annotations may be incorrect), without compromising the training accuracy. This may be accomplished by modifying the loss function to assign different weights to predictions about sentences in the source domain and the target domain. By assigning different weights to the clean data and the noisy data when calculating the loss function as described herein, a balance can be achieved that enables utilization of the noisy data without compromising the accuracy of the resulting model.

Therefore, embodiments of the present disclosure enable more efficient training of NLP models in a new domain. For example, a model for a new domain may be trained with less time and effort spent generating clean annotation data for training, without compromising accuracy.

The following terms are used throughout the present disclosure:

The term "natural language processing," or NLP, refers to techniques for using a computer to interpret natural language.

The term "annotation information" refers to data about the meaning and structure of a natural language phrase. Intent and slot-value are examples of annotation information. Other examples include grammatical structure information or semantic information (i.e., information about the meaning of the sentence that is more easily interpretable by an automated system).

The term "clean data" refers to training data for which the annotation information is known.

The term "noisy data" refers to training data that includes annotation information, but where some of the information is (or is likely to be) incorrect. According to certain embodiments of the disclosure, noisy training data is created for a target domain (e.g., movie ticket booking) by leveraging a machine learning model that has been trained to predict annotation data for a source domain (e.g., restaurant reservations).

The term "loss function" refers to a function that impacts how a machine learning model is trained under a supervised learning model. Specifically, during each training iteration, the output of the model is compared to the known annotation information in the training data. The loss function quantifies how close the predicted annotation data is to the actual annotation data. After computing the loss function, the parameters of the model are updated accordingly and a new set of predictions are made during the next iteration.

The term "distant supervision pipeline" refers to the process for generating noisy training data for training a model in a target domain using a pre-trained model in a different domain. The noisy data may be generated by delexicalizing sentences in the target domain, finding similar (delexicalized) sentences in the source domain, filling the similar sentences with arbitrary values, using the source model to provide annotation information for the sentences in the source domain, and mapping the annotation information back onto the sentences in the target domain.

The term "delexicalize" refers to the process of replacing domain specific words in a sentence or utterance with a generic type or category. For example, the phrase "I want to find a restaurant that serves American food" may be delexicalized into "I want to find a TERM that serves TYPE food."

System Overview

FIG. 1 shows an example of an NLP system according to aspects of the present disclosure. The example shown includes user 100, network 105, server 110, and database 115. A user 100 may provide a natural language query to the server 110, which may generate annotation information and then provide a response to the user 100 based on the annotation information. Server 110 may be an example of, or include aspects of, the corresponding element or elements described with reference to FIG. 3.

Server 100 may incorporate an artificial neural network (ANN). An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

According to embodiments of the present disclosure, an ANN trained for performing NLP tasks in a target domain may be trained using both clean and noisy data by modifying a loss function with weights that are different for the clean samples and the noisy samples. The noisy data may be generated to incorporate knowledge learned from a source domain different from the target domain. In a supervised learning framework, during each iteration, the training is iterated over each sample (or each batch of samples).

Server 100 may also incorporate a conversational agent (e.g., a chatbot) configured to respond to the user 100 based on the annotation information generated by the ANN. In some cases, server 100 may generate a response by querying information stored in the database 115. For example, if the user asks about times when a particular movie is showing, after the intent and slot-values of the query are used to determine what the user wants, the server 115 may then query the database 115 to obtain the desired information.

Figure 2:
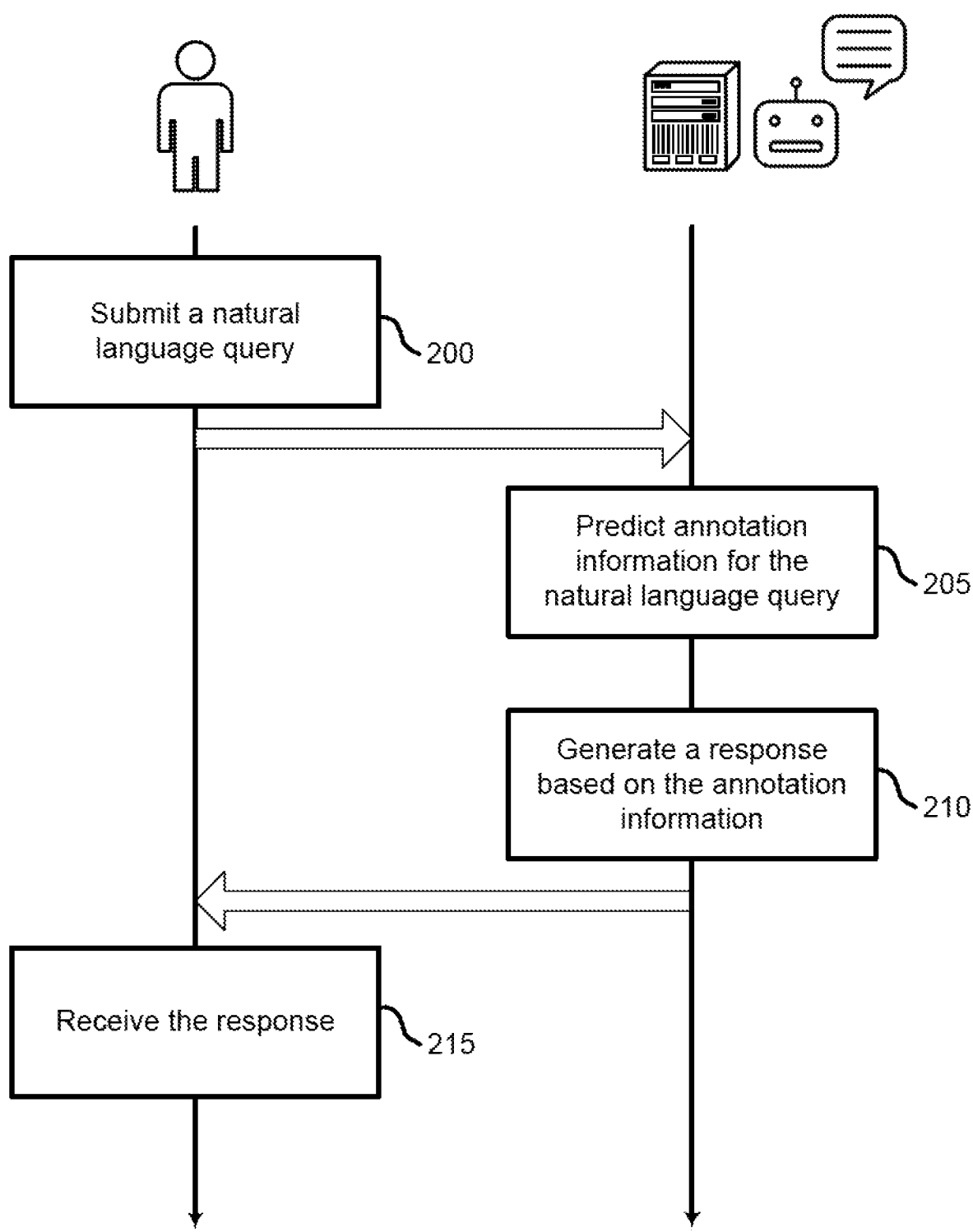
FIG. 2 shows an example of a process for NLP according to aspects of the present disclosure.

FIG. 2 shows an example of a process for NLP according to aspects of the present disclosure. In some examples, the operations of FIG. 2 may be performed by a system including a processor executing a set of codes to control functional elements of an apparatus. Additionally or alternatively, the processes may be performed using special-purpose hardware. For example, a server in an NLP system may include a graphics processing unit (GPU) or other processing unit specially designed to optimize the operation of an ANN. Generally, these operations may be performed according to the methods and processes described in accordance with aspects of the present disclosure. For example, the operations may be composed of various substeps, or may be performed in conjunction with other operations described herein.

At operation 200, a user submits a natural language query. The query may be a natural language sentence or utterance to express an intention or ask a question. For example, the user may state "I want to buy 2 tickets to the movie Star Wars for tomorrow." In some cases, the operations of this step may be performed by a user as described with reference to FIG. 1.

At operation 205, the NLP system predicts annotation information for the natural language query. For example, the annotation information may include the intent of "inform" and slot-values of {number-of-tickets: 2, movie: Star Wars, date: tomorrow}. In some cases, the operations of this step may be performed by a server as described with reference to FIGS. 1 and 3.

At operation 210, the NLP system generates a response based on the annotation information. For example, the NLP system may consult a database to find a number of theatres and movie times for the movie Star Wars, and the response may ask which of the theatres the user wants, or what show time the user wants. In some cases, the operations of this step may be performed by a chatbot as described with reference to FIG. 3.

At operation 215, the user receives the response from the NLP system. In some cases, the user may continue the conversation based on the response. For example, the user may inform the NLP system what show time and what theatre is preferred. In some cases, the operations of this step may be performed by a user as described with reference to FIG. 1.

System Architecture

Figure 3:
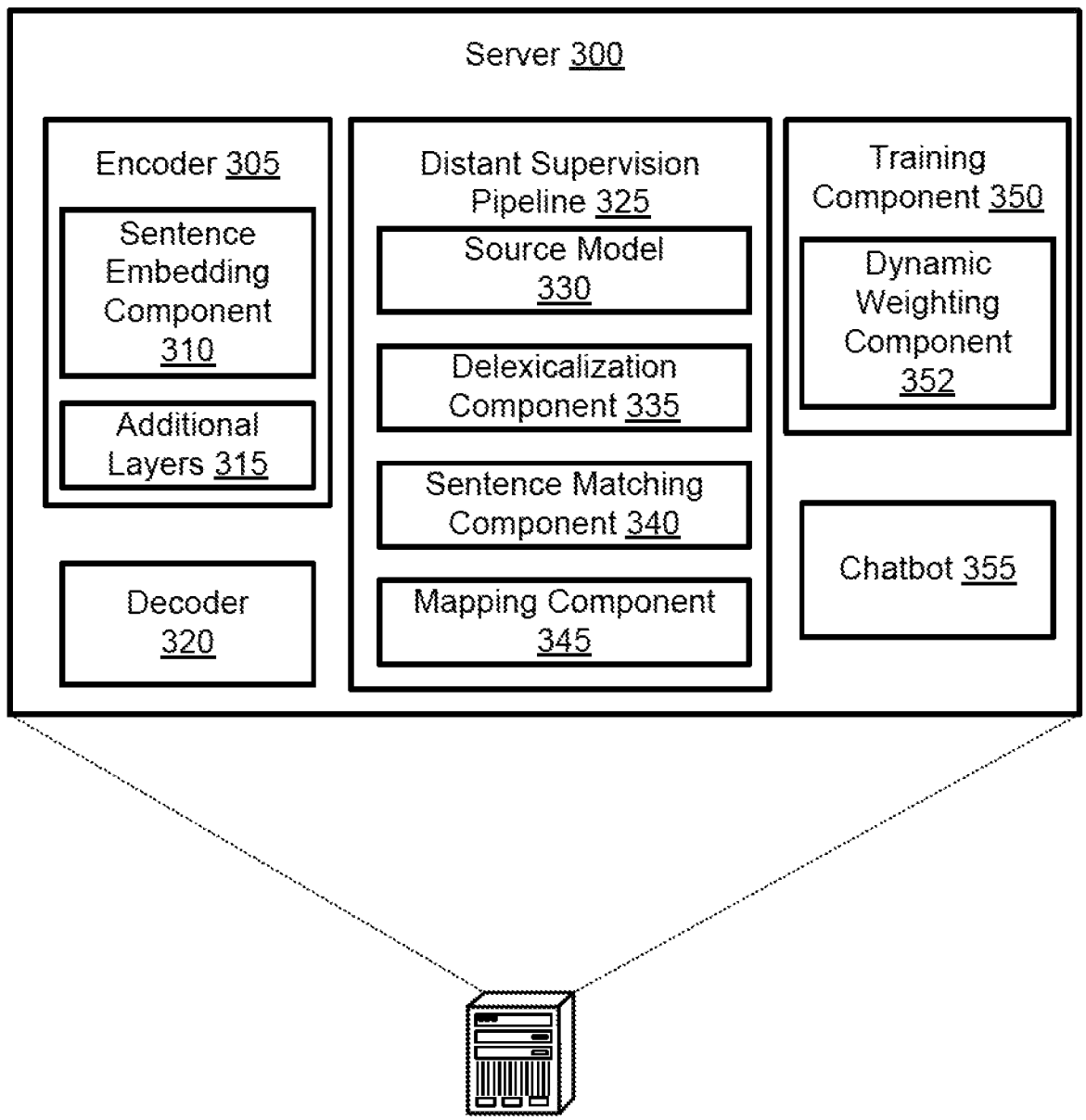
FIG. 3 shows an example of an NLP server according to aspects of the present disclosure.

FIG. 3 shows an example of an NLP server 300 according to aspects of the present disclosure. Server 300 may include encoder 305, decoder 320, distant supervision pipeline 325, training component 350, and chatbot 355. Server 300 may be an example of, or include aspects of, the corresponding element or elements described with reference to FIG. 1.

Encoder 305 may be configured to generate encoded representations for the sentences in the target domain. Encoder 305 may generate a sentence level representation and a token-wise representation for each sentence in the training data. Encoder 305 may include sentence embedding component 310 and one or more additional layers 315. In some examples, the sentence level representation or the token-wise representation, or both are generated using a Bidirectional Encoder Representations from Transformers (BERT) model. Decoder 320 may be configured to generate annotation data for sentences in the target domain based on the encoded representations. For example, decoder 320 may identify an intent class based on the sentence level representation and a set of slot labels based on the token-wise representation. In other words, the annotation information includes the intent class and the set of slot labels.

The encoder 305 and the decoder 320 may be trained using a weighted loss function that applies a first weight to clean data and at least one second weight to noisy data including the noisy annotation data for sentences in the target domain.

Distant supervision pipeline 325 may identify a set of unannotated sentences in a target domain, and generate noisy annotation data for sentences in a target domain based on similarities between sentences in the target domain and sentences in a source domain, an annotation model for the source domain, and a heuristic mapping between the source domain and the target domain. In some examples, the distant supervision pipeline 325 includes a source model 330, a delexicalization component 335, a sentence matching component 340, and a mapping component 345.

Source model 330 may generate annotation information for the similar delexicalized sentence using an annotation model trained for the source domain.

Delexicalization component 335 may delexicalize a set of sentences (either the unannotated sentences in the target domain or the similar sentences in the source domain). Delexicalization component 335 may also fill at least one arbitrary value in the similar delexicalized sentence.

Sentence matching component 340 may identify a similar delexicalized sentence in a source domain corresponding to each sentence in the set of unannotated sentences. In some examples, the similar delexicalized sentence is identified based on a path metric, a Wu-Palmer metric, or a Fasttext metric.

Mapping component 345 may apply a heuristic mapping to the annotation information for the similar delexicalized sentence in the source domain to produce annotation information for the corresponding sentence in the set of unannotated sentences in the target domain. The noisy data may include the annotation information for the corresponding sentence in the set of unannotated sentences.

Training component 350 may compute a loss value for the annotation information using a weighted loss function. The weighted loss function applies a first weight to the clean data and at least one second weight to the noisy data. The at least one second weight may be between zero and the first weight. Training component 350 may also update the artificial neural network (ANN) based on the loss value. Training component 350 may perform multiple training iterations, where the loss value is computed and the parameters of the ANN are updated during each of the training iterations.

In some examples, the weighted loss function includes an $L_q$ loss function, where the first weight includes a first constant parameter for all of the clean data and the at least one second weight includes a second constant parameter for all of the noisy data. In some examples, the first constant parameter is between 0.65 and 0.75, the second constant parameter is between 0.25 and 0.35, and a sum of the first constant parameter and the second constant parameter is equal to 1.

In some examples, the weighted loss function includes a dynamic sample re-weighting algorithm as described below with reference to FIG. 6. The dynamic weighting algorithm may be performed using a dynamic weighting component 352.

Model Training

Figure 4:
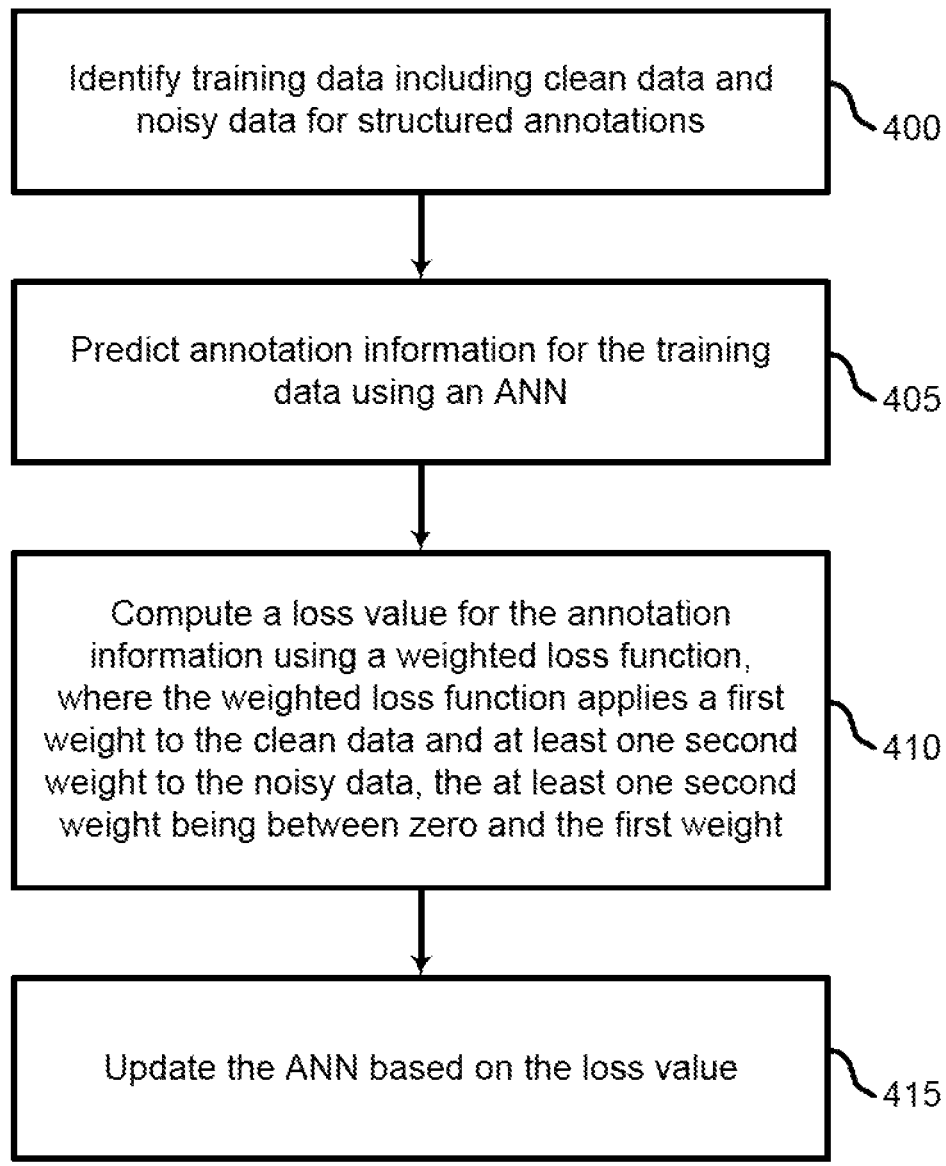
FIG. 4 shows an example of a process for training a model for predicting annotation information using a model trained in another domain according to aspects of the present disclosure.

FIG. 4 shows an example of a process for training a model for predicting annotation information using a model trained in another domain according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

In an example embodiment, the model performs the NLP task of joint intent-slot prediction. For a domain A, a set of discrete intents $I_a$, set of slot-types $S_a$, and a possible set of values $V_s$ are assumed for each slot. The task joint intent-slot prediction is to learn a prediction model $P_\theta$ that inputs a natural language sentence x and outputs a structure $F_x = \langle i_x, (S_x, V_x) \rangle$ where $i_x \in I_a$ is the intent and $(S_x, V_x) = \{(s_n, v_n) | s_n \in S_a, v_n \in V_s\}$ are the set of slot-value pairs present in a sentence. For a domain B, a set of labeled and unlabeled training data $D_B = (D_b^{labeled} \cup D_b^{unlabeled})$ are used, where the percentage of labeled data may be very low ($|D_b^{labeled}| \ll |D_b^{unlabeled}|$). The prediction model $P_{\theta_b}$ is trained in domain B by consulting another trained model $P_{\theta_a}$ in a similar domain A, where $\theta_a$ is unknown. For example, movie-ticket booking and restaurant information retrieval may be used as target and source domains respectively.

Thus, at operation 400, the NLP system identifies training data including clean data and noisy data for structured annotations (e.g., using the distant supervision pipeline described below with reference to FIG. 5). For example, the clean data may be annotated sentences in the domain of movie ticket booking, while the noisy data may be annotated sentences generated for the movie ticket booking domain based on a pre-trained model in the restaurant information retrieval domain. In some cases, the operations of this step may be performed by an NLP system as described with reference to FIG. 1.

At operation 405, the NLP system predicts annotation information for the training data using an ANN. For example, the ANN may be pre-populated with random parameters. Then these parameters may be used to predict annotation information for the clean training data and the noisy training data. In some cases, the operations of this step may be performed by a server as described with reference to FIG. 3.

An encoder-decoder architecture may be used to jointly model sentence-level intent classification and the token-level sequence labelling (slot-value) task. In one embodiment, pre-trained BERT layers may be used for slot filling. Thus, in an example training architecture, a BERT encoder is used. The encoder encodes a sentence $x = \langle x_1, x_2, x_3 \ldots x_n \rangle$ and produces sentence-level pooled representation ($h_0$) along with token-wise representations $\langle h_1, h_2, h_3 \ldots h_n \rangle$. In addition to the encoder, one or more fully connected (FC) layers and softmax activation (denoted as f(.)) may be used to predict classes. Then $f_i(h_0)$ is used to predict the intent class and $f_s(h_i)$ is used to predict i-th slot label. The baseline system uses categorical cross entropy (CCE) minimization for jointly training both intent identification and slot-filling.

At operation 410, the NLP system computes a loss value for the annotation information using a weighted loss function, where the weighted loss function applies a first weight to the clean data and at least one second weight to the noisy data, the at least one second weight being between zero and the first weight. In some cases, the operations of this step may be performed by a training component as described with reference to FIG. 3.

For example, the weighted loss function may include an $L_q$ loss function or a loss function based on dynamic sample re-weighting. The noise-robust yet efficient $L_q$ loss is described below in further detail. The dynamic sample weighting (or re-weighting) is described in more detail with reference to FIG. 6.

The $L_q$ loss strikes a balance between the noise-robust but difficult to converge mean-absolute-error (MAE) and the non-robust CCE. The $L_q$ loss uses a negative Box-Cox transformation:

$$L_q(f(x), e_j) = \frac{(1 - f_j(x)^q)}{q},$$

where f(x) is the classifier prediction (DNN with softmax output) with $f_j$ denoting the j'th element of f and $e_j \in \{0,1\}^C$ being the onehot slot label of x for c classes. The value $q \in (0,1]$ is a hyper-parameter, where a lower $q (q \to 0)$ converges to CCE and a q closer to 1 makes $L_q$ converge towards the MAE.

Generalized cross entropy loss for training deep neural networks with noisy labels use a truncated $L_q$ loss, performed by truncating the loss function by an upper bound $L_q(k) = (1-k^q)/q$, where k is a hyper-parameter. The truncated $L_q$ loss assigns weights of 0 and 1 to noisy and clean samples respectively, determined by the bound of $L_q(k)$, where noisy samples are ignored, by assigning the noisy samples a weight of 0. Alternatively, the present disclosure uses a heuristic mechanism for re-weighting clean and noisy samples. Clean labels are still assigned the weight of 1. A threshold $L_q(k)$ is fixed and after each epoch, a weight is assigned to the samples whose $L_q$ loss crosses this threshold, rather than 0, and the remaining noisy samples were assigned a weight.

At operation 415, the NLP system updates the ANN based on the loss value. In some cases, the operations of this step may be performed by a training component as described with reference to FIG. 3. In an example scenario (i.e., using movie-ticket booking as the target domain, and a restaurant-lookup chatbot as the source domain), a goal-oriented chatbot may be trained on the DSTC-2 dataset as the pretrained source model. The goal-oriented chatbot may support, for example, 28 user intents and 4 slot-keys. A simulated movie dialogue dataset (SimM) may be used as the movie ticket booking target domain.

The SimM dataset supports 15 single-turn user intents and 5 slot-keys. A small fraction of training data is considered as labeled data for the target domain, and the remainder of the data is used as unlabeled data. The SimM dataset includes a collection of multi-turn dialogues. Individual user utterances with corresponding intent and slot-value pairs are used as data points (leading to approximately 4,000 training data points). Multi-intent utterances may be converted into single intent by deeming more frequent intents as the primary intent. A BIO sequence labelling format is adopted for the slot-filling task. Tokens in the input utterance are classified into one of several classes, indicating that a token is the beginning (B), interior (I) or not part (O) of the slot-value pair.

Thus, a joint intent-slot prediction model may be trained by leveraging a small amount of annotated data, large amount of unlabeled data, and a black-box model (i.e., the source model) trained in a similar but different domain. Learning automatically from trained deployed conversational agents may help in transferring knowledge learned from experiencing natural conversations. In some cases, the source model may be opaque. That is, it is not necessary to know the architecture of the source model. For the target movie ticket-booking domain and the source restaurant information retrieval domain, embodiments of the present disclosure may increase accuracy over baselines that do not leverage unlabeled data annotated by the opaque source model.

In other words, the amount of training data used to train the movie-ticket booking model may be reduced substantially (i.e., cut in half) without sacrificing accuracy by supplementing the training data with noisy data generated by the distant supervision pipeline (i.e., using restaurant-lookup chatbot as the source domain). In some cases, Conditional Random Fields (CRF) may be used to model the structured label noise. However, CRF may not provide individual label-wise accuracy.

Distant Supervision Pipeline

Figure 5:
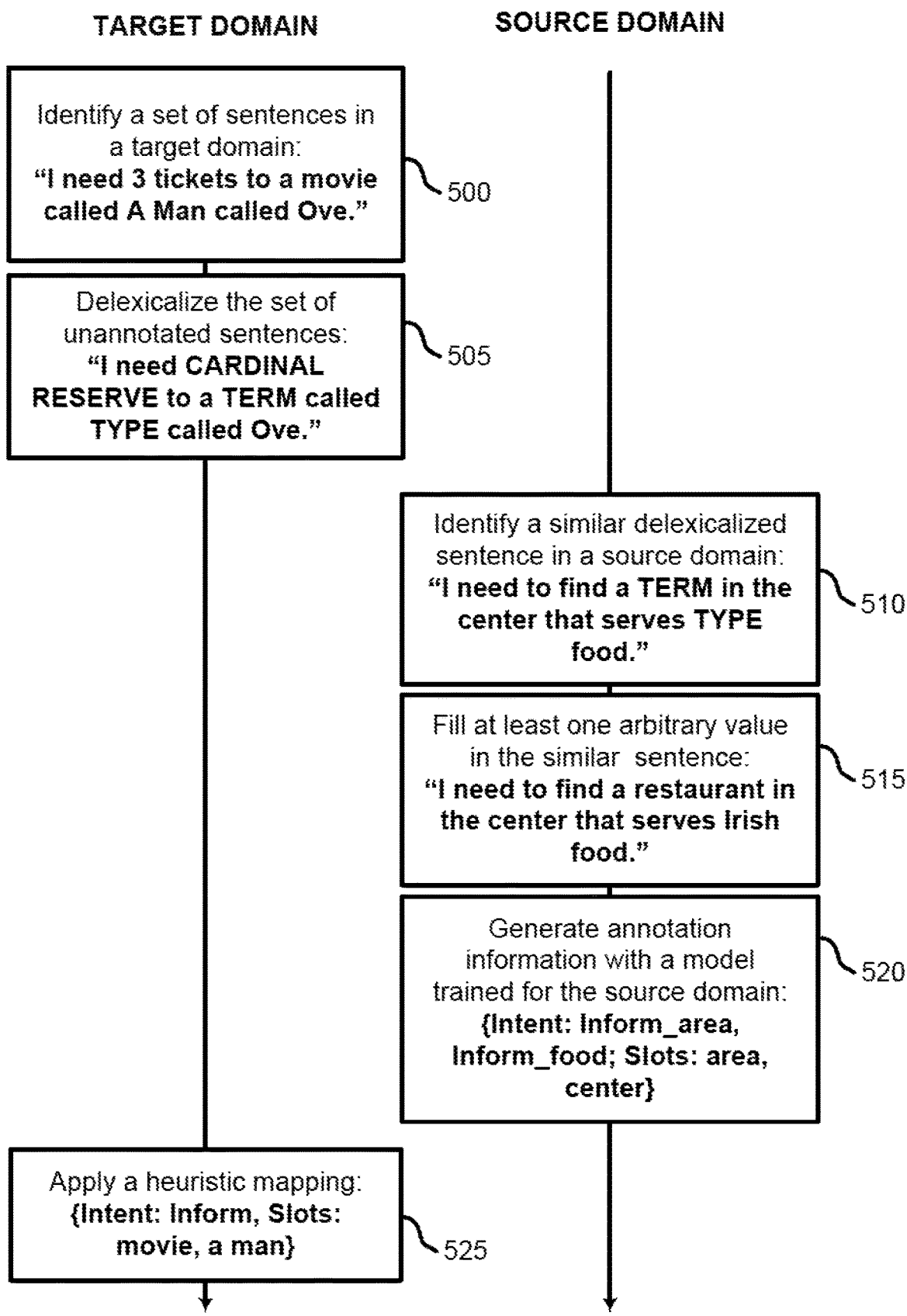
FIG. 5 shows an example of a process for generating noisy data for a target domain using a model on data from a source domain according to aspects of the present disclosure.

FIG. 5 shows an example of a process for generating noisy data for a target domain using a model on data from a source domain according to aspects of the present disclosure. Specifically, FIG. 5 depicts the workflow used for an unlabeled target domain utterance ("I need 3 tickets to a movie called A Man called Ove") to obtain a noisy label by consulting the source domain.

In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 500, the NLP system identifies a set of unannotated sentences (i.e., utterances) in a target domain, $u_b$. In some cases, the operations of this step may be performed by a distant supervision pipeline as described with reference to FIG. 3. For example, the sentence may be "I need 3 tickets to a movie called A Man called Ove."

At operation 505, the NLP system delexicalizes the set of unannotated sentences. In some cases, the operations of this step may be performed by a delexicalization component as described with reference to FIG. 3. That is, to deal with the domain diversity of source and target, utterances are delexicalize by replacing named entity values with their corresponding entity types. For example, "6 pm" may be replaced by "TIME." In one embodiment, the Spacy API may be used to detect named entities, along with domain-specific heuristics to identify entity values and types.

Thus, the example sentence may be transformed to "I need CARDINAL RESERVE to a TERM called TYPE called Ove." Note that the delexicalization may be imperfect, and thus may be a source of errors or noise.

At operation 510, the NLP system identifies a similar delexicalized sentence, $u_a$, in the source domain corresponding to each sentence, $u_b$, in the set of unannotated sentences of the target domain. In some cases, the operations of this step may be performed by a sentence matching component as described with reference to FIG. 3. In other words, an utterance in target domain $u_b$ is mapped to a similar utterance in the source domain $u_a$.

For example, a similar sentence in the restaurant reservation domain may be "I need to find a TERM in the center that serves TYPE food." The similar sentence may already be delexicalized.

At operation 515, the NLP system fills at least one arbitrary value in the similar delexicalized sentence. In some cases, the operations of this step may be performed by a delexicalization component as described with reference to FIG. 3. For example, the delexicalized sentence may be filled with arbitrary values resulting in "I need to find a restaurant in the center that serves Irish food."

At operation 520, the NLP system generates annotation information for the similar delexicalized sentence using an annotation model trained for the source domain. That is, the utterance, $u_a$, is fed as an input to the trained source model $P_{\theta_a}$. In some cases, the operations of this step may be performed by a source model as described with reference to FIG. 3. For example, the annotation data may be {Intent: Inform area, Inform food; Slots: area, center}.

At operation 525, the NLP system apply a heuristic mapping to the annotation information for the similar delexicalized sentence in the source domain to produce annotation information for the corresponding sentence in the set of unannotated sentences in the target domain. In some cases, the operations of this step may be performed by a mapping component as described with reference to FIG. 3.

For example, the heuristic mapping may result in {Intent: Inform, Slots: movie, a man}. Thus, the response $r_a$ obtained from the source model may be mapped back to the labels in target domain as $r_b'$. A combination of path similarity, Wu similarity, Palmers similarity, and Fasttext similarity may be used to map $u_a \leftrightarrow u_b$ and $r_a \leftrightarrow r_b'$.

Dynamic Sample Weighting

Figure 6:
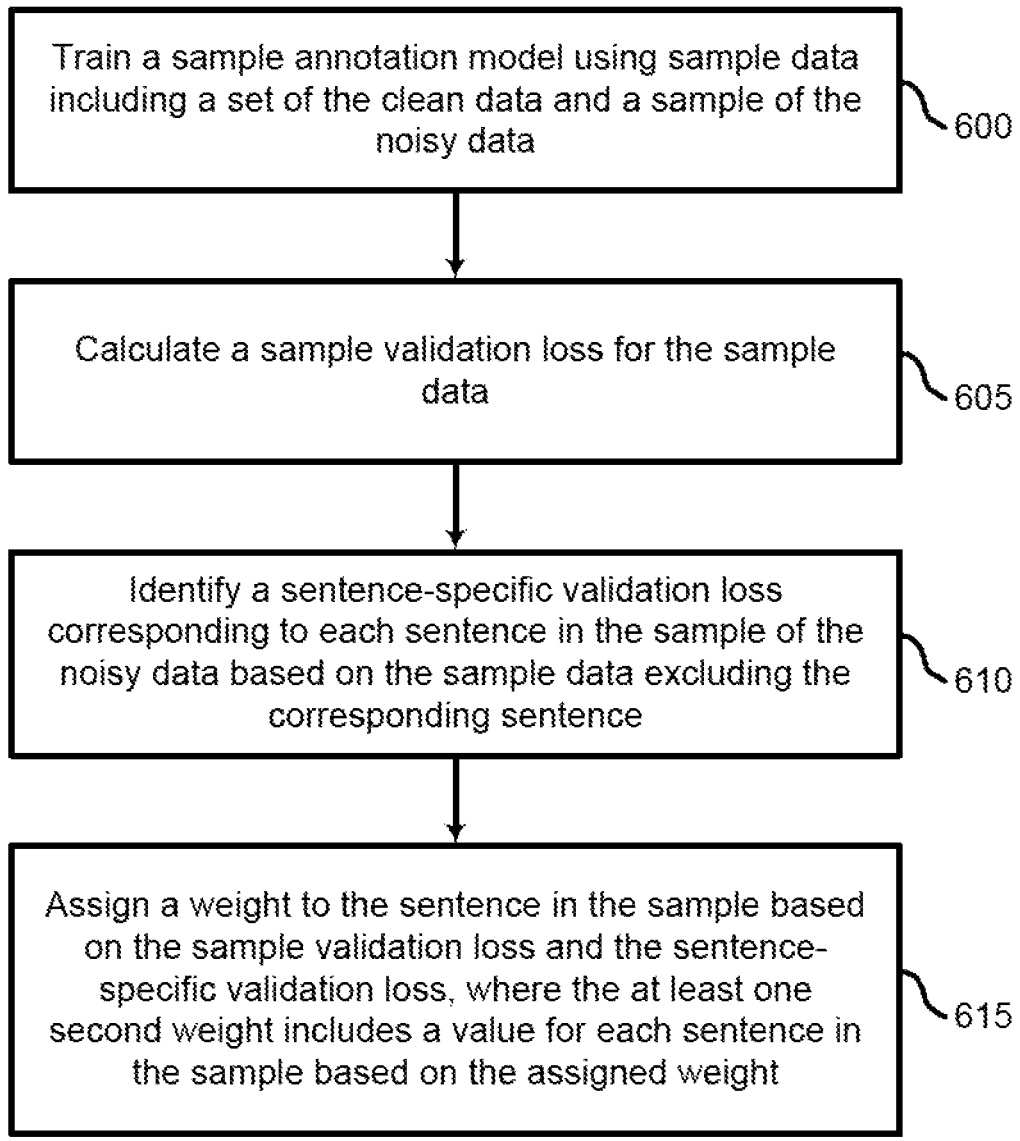
FIG. 6 shows an example of a process for dynamic sample weighting according to aspects of the present disclosure.

FIG. 6 shows an example of a process for dynamic sample weighting according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

As discussed above, embodiments of the present disclosure provide for a dynamic sample re-weighting algorithm. The dynamic sample re-weighting algorithm is a more disciplined approach to assign weights to each training sample in the range of [0, 1] dynamically based on (and proportionate to) the varying degrees of noise in the sample. To this end, the dynamic sample re-weighting algorithm aims to assign higher weights to less noisy samples to compare the loss value on validation batch before and after leaving each sample out of the training batch. The dynamic sample re-weighting algorithm uses a negative correlation between how noisy a given sample is, and how much of a decrease in validation loss the negative correlation leads to when the negative correlation is included for training as opposed to when negative correlation is not.

Accordingly, at operation 600, the NLP system trains a sample annotation model using sample data including a set of the clean data and a sample of the noisy data. In some cases, the operations of this step may be performed by a training component as described with reference to FIG. 3.

At operation 605, the NLP system calculates a sample validation loss for the sample data. In some cases, the operations of this step may be performed by a dynamic weighting component as described with reference to FIG. 3.

At operation 610, the NLP system identifies a sentence-specific validation loss corresponding to each sentence in the sample of the noisy data based on the sample data excluding the corresponding sentence. In some cases, the operations of this step may be performed by a dynamic weighting component as described with reference to FIG. 3.

At operation 615, the NLP system assigns a weight to the sentence in the sample based on the sample validation loss and the sentence-specific validation loss, where the at least one second weight includes a value for each sentence in the sample based on the assigned weight. In some cases, the operations of this step may be performed by a dynamic weighting component as described with reference to FIG. 3.

In some examples, the process described herein with reference to FIG. 6 may be repeated for multiple iterations. During each iteration, the assigned sample weights may be different.

Training a Model Using Noisy Data from a Different Domain

Figure 7:
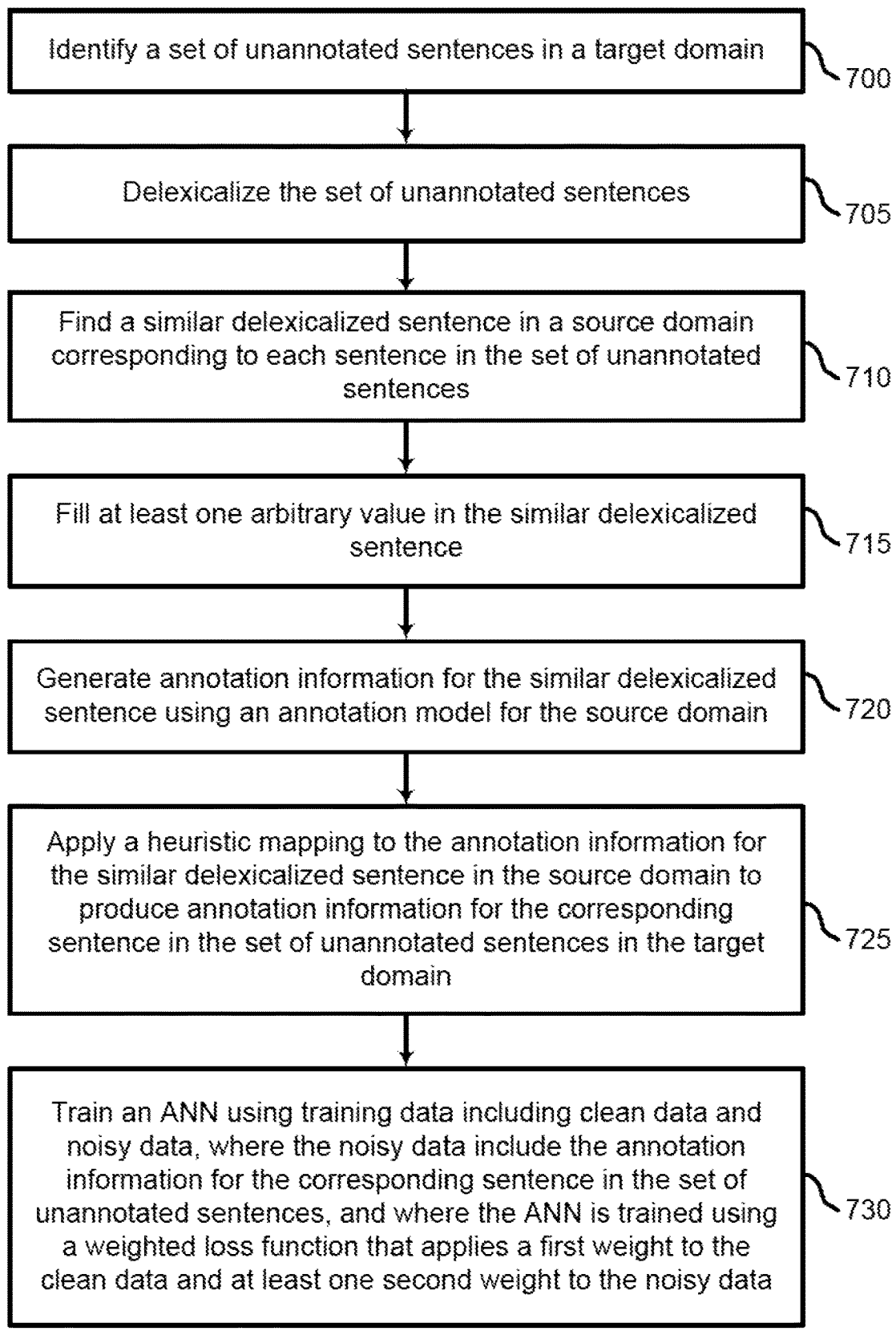
FIG. 7 shows an example of a process for training an annotation model using noisy data according to aspects of the present disclosure.

FIG. 7 shows an example of a process for training an annotation model using noisy data according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 700, the NLP system identifies a set of unannotated sentences in a target domain. In some cases, the operations of this step may be performed by a distant supervision pipeline as described with reference to FIG. 3.

At operation 705, the NLP system delexicalizes the set of unannotated sentences. In some cases, the operations of this step may be performed by a delexicalization component as described with reference to FIG. 3.

At operation 710, the NLP system finds a similar delexicalized sentence in a source domain corresponding to each sentence in the set of unannotated sentences. In some cases, the operations of this step may be performed by a sentence matching component as described with reference to FIG. 3.

At operation 715, the NLP system fills at least one arbitrary value in the similar delexicalized sentence. In some cases, the operations of this step may be performed by a delexicalization component as described with reference to FIG. 3.

At operation 720, the NLP system generates annotation information for the similar delexicalized sentence using an annotation model for the source domain. In some cases, the operations of this step may be performed by a source model as described with reference to FIG. 3.

At operation 725, the NLP system apply a heuristic mapping to the annotation information for the similar delexicalized sentence in the source domain to produce annotation information for the corresponding sentence in the set of unannotated sentences in the target domain. In some cases, the operations of this step may be performed by a mapping component as described with reference to FIG. 3.

At operation 730, the NLP system trains an ANN using training data including clean data and noisy data, where the noisy data include the annotation information for the corresponding sentence in the set of unannotated sentences, and where the ANN is trained using a weighted loss function that applies a first weight to the clean data and at least one second weight to the noisy data. In some cases, the operations of this step may be performed by a training component as described with reference to FIG. 3.

Accordingly, the present disclosure includes the following embodiments.

A method for predicting annotation information using a model trained in another domain is described. Embodiments of the method may include identifying training data including clean data and noisy data for structured annotations, predicting annotation information for the training data using an artificial neural network (ANN), computing a loss value for the annotation information using a weighted loss function, wherein the weighted loss function applies a first weight to the clean data and at least one second weight to the noisy data, the at least one second weight being between zero and the first weight, and updating the ANN based on the loss value.

Some examples of the method described above may further include identifying a set of unannotated sentences in a target domain. Some examples may further include delexicalizing the set of unannotated sentences. Some examples may further include identifying a similar delexicalized sentence in a source domain corresponding to each sentence in the set of unannotated sentences. Some examples may further include filling at least one arbitrary value in the similar delexicalized sentence. Some examples may further include generating annotation information for the similar delexicalized sentence using an annotation model trained for the source domain. Some examples may further include apply a heuristic mapping to the annotation information for the similar delexicalized sentence in the source domain to produce annotation information for the corresponding sentence in the set of unannotated sentences in the target domain, wherein the noisy data includes the annotation information for the corresponding sentence in the set of unannotated sentences.

In some examples, the similar delexicalized sentence is identified based on a path metric, a Wu-Palmer metric, or a Fasttext metric. Some examples of the method described above may further include generating a sentence level representation and a token-wise representation for each sentence in the training data. Some examples may further include identifying an intent class based on the sentence level representation and a set of slot labels based on the token-wise representation using a decoder, wherein the annotation information includes the intent class and the set of slot labels. In some examples, the sentence level representation or the token-wise representation is generated using a Bidirectional Encoder Representations from Transformers (BERT) model. Some examples of the method described above may further include performing a plurality of training iterations, wherein the loss value is computed and the parameters of the ANN are updated during each of the training iterations.

In some examples, the weighted loss function includes an $L_q$ loss function. In some examples, the first weight includes a first constant parameter for all of the clean data and the at least one second weight includes a second constant parameter for all of the noisy data. In some examples, the first constant parameter is between 0.65 and 0.75, the second constant parameter is between 0.25 and 0.35, and a sum of the first constant parameter and the second constant parameter is equal to 1. In some examples, the sample validation loss is recalculated during each of a plurality of training iterations.

Some examples of the method described above may further include training a sample annotation model using sample data including a set of the clean data and a sample of the noisy data. Some examples may further include calculating a sample validation loss for the sample data. Some examples may further include identifying a sentence-specific validation loss corresponding to each sentence in the sample of the noisy data based on the sample data excluding the corresponding sentence. Some examples may further include assigning a weight to the sentence in the sample based on the sample validation loss and the sentence-specific validation loss, wherein the at least one second weight includes a value for each sentence in the sample based on the assigned weight.

A method for training an ANN is described. Embodiments of the method may include identifying a set of unannotated sentences in a target domain, delexicalizing the set of unannotated sentences, finding a similar delexicalized sentence in a source domain corresponding to each sentence in the set of unannotated sentences, filling at least one arbitrary value in the similar delexicalized sentence, generating annotation information for the similar delexicalized sentence using an annotation model for the source domain, apply a heuristic mapping to the annotation information for the similar delexicalized sentence in the source domain to produce annotation information for the corresponding sentence in the set of unannotated sentences in the target domain, and training an ANN using training data including clean data and noisy data, wherein the noisy data include the annotation information for the corresponding sentence in the set of unannotated sentences.

In some examples, the similar delexicalized sentence is identified based at least in part on a path metric, a Wu-Palmer metric, or a Fasttext metric. In some examples, the ANN is trained using $L_q$ loss function that applies a first weight to the clean data and a second weight to the noisy data. In some examples, the ANN is trained using a loss function that applies a first weight to the clean data and second weights to the noisy data based on a dynamic sample re-weighting algorithm.

A system for predicting annotation information using a model trained in another domain is described. Embodiments of the system may include a distant supervision pipeline configured to generate noisy annotation data for sentences in a target domain based on similarities between sentences in the target domain and sentences in a source domain, an annotation model for the source domain, and a heuristic mapping between the source domain and the target domain, an encoder configured to generate encoded representations for the sentences in the target domain, and a decoder configured to generate annotation data for sentences in the target domain based on the encoded representations, wherein the encoder and the decoder are trained using a weighted loss function that applies a first weight to clean data and at least one second weight to noisy data including the noisy annotation data for sentences in the target domain.

In some examples, the encoder comprises a sentence embedding component and at least one additional neural network layer. In some examples, the sentence embedding component comprises a BERT model. In some examples, the sentence embedding component is configured to generate a sentence level representation and a token-wise representation for each sentence in the training data. In some examples, the distant supervision pipeline comprises a source model, a delexicalization component, a sentence matching component, and a mapping component.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method of training a system for natural language processing (NLP), comprising:
    identifying NLP training data for training an artificial neural network (ANN) to generate structured annotations in a target domain, the NLP training data including a clean labeled data set and an unlabeled data set in the target domain;
    generating labels for the unlabeled data set using a neural network model trained in a source domain to obtain a noisy labeled data set in the target domain;
    predicting annotation information for the NLP training data using the (ANN), wherein the annotation information includes a first annotation corresponding to a first sample text from the clean labeled data set and a second annotation corresponding to a second sample text from the noisy labeled data set;
    selecting a first weight for the first sample text based on the first sample text coming from the clean labeled data set and selecting a second weight for the second sample text based on the second sample text coming from the noisy labeled data set;
    computing a loss value for the annotation information using a weighted loss function, wherein the weighted loss function applies the first weight to the first sample text and the second weight to the second sample text; and
    updating the ANN based on the loss value.

2. The method of claim 1, further comprising:
    identifying a set of unannotated sentences in the target domain;
    delexicalizing the set of unannotated sentences;
    identifying a similar delexicalized sentence in the source domain corresponding to each sentence in the set of unannotated sentences;
    filling at least one arbitrary value in the similar delexicalized sentence;
    generating annotation information for the similar delexicalized sentence using the neural network model trained in the source domain; and
    apply a heuristic mapping to the annotation information for the similar delexicalized sentence in the source domain to produce annotation information for the corresponding sentence in the set of unannotated sentences in the target domain, wherein the noisy labeled data set comprises the annotation information for the corresponding sentence in the set of unannotated sentences.

3. The method of claim 2, wherein:
    the similar delexicalized sentence is identified based at least in part on a path metric, a Wu-Palmer metric, or a Fasttext metric.

4. The method of claim 1, further comprising:
    generating a sentence level representation and a token-wise representation for each sentence in the NLP training data; and
    identifying an intent class based on the sentence level representation and a set of slot labels based on the token-wise representation using a decoder, wherein the annotation information comprises the intent class and the set of slot labels.

5. The method of claim 4, wherein:
    the sentence level representation or the token-wise representation is generated using a Bidirectional Encoder Representations from Transformers (BERT) model.

6. The method of claim 1, further comprising:
    performing a plurality of training iterations, wherein the loss value is computed and the ANN is updated during each of the training iterations.

7. The method of claim 1, wherein:
    the weighted loss function comprises an Lq loss function.

8. The method of claim 1, wherein:
    the first weight comprises a first constant parameter for the clean labeled data set and the second weight comprises a second constant parameter for the noisy labeled data set.

9. The method of claim 8, wherein:
    the first constant parameter is between 0.65 and 0.75, the second constant parameter is between 0.25 and 0.35, and a sum of the first constant parameter and the second constant parameter is equal to 1.

10. The method of claim 1, further comprising:
    training a sample annotation model using sample data including a set of the clean labeled data set and a sample of the noisy labeled data set;
    calculating a sample validation loss for the sample data;
    identifying a sentence-specific validation loss corresponding to each sentence in the sample of the noisy labeled data set based on the sample data excluding the corresponding sentence; and
    assigning a weight to the sentence in the sample based on the sample validation loss and the sentence-specific validation loss, wherein the second weight comprises a value for each sentence in the sample based on the assigned weight.

11. The method of claim 10, wherein:
    the sample validation loss is recalculated during each of a plurality of training iterations.

12. A method of training a system for natural language processing (NLP), comprising:
    identifying a set of unannotated sentences in a target domain;
    delexicalizing the set of unannotated sentences;
    finding a similar delexicalized sentence in a source domain corresponding to each sentence in the set of unannotated sentences;
    filling at least one arbitrary value in the similar delexicalized sentence;
    generating annotation information for the similar delexicalized sentence using an annotation model for the source domain;
    apply a heuristic mapping to the annotation information for the similar delexicalized sentence in the source domain to produce annotation information for the corresponding sentence in the set of unannotated sentences in the target domain; and
    training an artificial neural network (ANN) using training data including clean data and noisy data, wherein the noisy data include the annotation information for the corresponding sentence in the set of unannotated sentences.

13. The method of claim 12, wherein:
    the similar delexicalized sentence is identified based at least in part on a path metric, a Wu-Palmer metric, or a Fasttext metric.

14. The method of claim 12, wherein:
the ANN is trained using $L_q$ loss function that applies a first weight to the clean data and a second weight to the noisy data.

15. The method of claim 12, wherein:
the ANN is trained using a loss function that applies a first weight to the clean data and second weights to the noisy data based on a dynamic sample re-weighting algorithm.

16. A system for natural language processing, comprising:
a distant supervision pipeline configured to generate a noisy labeled data set for unlabeled sentences in a target domain based on similarities between the sentences in the target domain and sentences in a source domain, based on an annotation model trained in the source domain, and based on a heuristic mapping between the source domain and the target domain, wherein the annotation model generates labels for the unlabeled sentences to obtain the noisy labeled data set in the target domain;
an encoder configured to generate encoded representations for the sentences in the target domain; and
a decoder configured to generate annotation data for sentences in the target domain based on the encoded representations, wherein the annotation data include first annotation data corresponding to a clean labeled data set and second annotation data corresponding to the noisy labeled data set, and wherein the encoder and the decoder are trained using a weighted loss function that applies a first weight to the clean labeled data set and a second weight to the noisy labeled data set.

17. The system of claim 16, wherein:
the encoder comprises a sentence embedding component and at least one additional neural network layer.

18. The system of claim 17, wherein:
the sentence embedding component comprises a Bidirectional Encoder Representations from Transformers (BERT) model.

19. The system of claim 17, wherein:
the sentence embedding component is configured to generate a sentence level representation and a token-wise representation.

20. The system of claim 16, wherein:
the distant supervision pipeline comprises a source model, a delexicalization component, a sentence matching component, and a mapping component.

\* \* \* \* \*